Oct. 29, 1957 D. P. KENNEDY 2,811,591

FEEDBACK NETWORK COMPENSATIONS

Filed Aug. 30, 1954

INVENTOR
DAVID P. KENNEDY
BY
ATTORNEY

United States Patent Office 2,811,591

Patented Oct. 29, 1957

2,811,591

FEEDBACK NETWORK COMPENSATIONS

David P. Kennedy, Waltham, Mass., assignor to Raytheon Manufacturing Company, Waltham, Mass., a corporation of Delaware Application August 30, 1954, Serial No. 453,051

8 Claims. (Cl. 179—171)

This application relates to a compensated feedback network and, more particularly, to a negative feedback amplifier whose feedback loop is of relatively small band width at correspondingly high return ratios.

The utilization of negative feedback in amplifiers is well known for improving the frequency response and for reducing low frequency circuit instabilities and low frequency noise generated within certain sections of the amplifier.

In active feedback networks in which a large amount of feedback is required, oscillations may be produced in the network when the phase shift in the feedback loop reaches 180° before the gain falls below unity. The likelihood of system instability is sometimes obviated by inserting an attenuating network in the feedback loop. However, the gain or transfer function of a feedback amplifier whose return ratio $\mu\beta$ is large compared to unity is approximately inversely proportional to the factor $\beta$. The gain of the system, however, must be maintained substantially constant over the normal operating band of the system which may, for example, range from zero to 5,000 cycles per second. A compensating network in the feedback loop capable of maintaining a constant return ratio throughout the audio pass band of the system is extremely difficult to design.

Outside the operating band of a feedback amplifier it is desirable to attenuate the return ratio $\mu\beta$ as rapidly as possible in order to reduce the gain to less than unity. The greatest practical cut-off attenuation rate that may be employed over any extended frequency spectrum in a feedback amplifier is 10 decibels per octave, corresponding to a phase shift of approximately 150 degrees, where a margin of safety of about 30 degrees phase shift from a critical limit of 180 degrees is ordinarily maintained. If this limiting rate of 10 decibels per octave is exceeded, oscillations are likely to occur. The ideal characteristic for the feedback loop, therefore, is for $\mu\beta$ to be constant in the normal operating band and at higher frequencies to diminish in magnitude as rapidly as possible while still keeping the phase shift less than 180 degrees by an adequate margin.

In circuits requiring feedback of the order of 60 decibels for eliminating low frequency noise, the equipment must be capable of phase correction to six octaves where a maximum rate of attenuation with frequency of the return ratio is 10 decibels per octave; if rates of less than approximately 10 decibels per octave are used, even more severe demands are made upon the amplifier system. If a pass band up to, say, 5,000 cycles per second is required and the 10 decibel per octave rate is adhered to, the feedback network must be capable of passing six octaves above 5,000 megacycles, or 320 kilocycles. Such a feedback loop is difficult, if not impossible, to achieve.

In applications in which feedback is used to eliminate only low frequency noise or other disturbances, it is possible to commence the attenuation of the return ratio $\mu\beta$ well within the pass band of the system by means of an attenuating network in the feedback or $\beta$ loop. For example, if the attenuation of the return ratio begins at, say, four cycles per second, the band pass of the feedback network for a maximum feedback of 60 decibels and an attenuation rate of, say, six decibels per octave, would be only 4096 cycles per second, resulting in a readily designable compensating network for the feedback loop.

The effects of the return ratio reduction upon the system transfer function must now be compensated for. In accordance with this invention the necessary correction is provided by a second or compensating network inserted in the input to the system for providing compensation to that of the network in the feedback loop. This compensating network must have a transfer function or gain which will maintain the overall circuit gain constant with frequency throughout the pass band to be used. If the amplifier gain without the compensating network is $$\frac{\mu}{1+\mu\beta}$$

where $\mu\beta$ is dependent upon frequency and the overall system transfer function or gain is to be independent of frequency, the compensating network should have a transfer function given by $1+\mu\beta$, where $\mu\beta$ is still a function of frequency. The compensating network may be identical to that of the network in the feedback loop provided the loop gain is large as compared to unity. By means of this second network, the use of high return ratios at lower frequencies is permissible without appreciably extending the band width of the return loop.

It should be understood, of course, that the examples given above are purely illustrative and that the invention is not limited to any particular feedback network or to any frequency operating range. Furthermore, the frequency band of the feedback loop will depend not only on the frequency at which the attenuation of the return ratio commences but also upon the rate of attenuation. An attenuation rate of other than six decibels per octave could be used provided, of course, that the limit of 10 decibels per octave is not exceeded. Since an attenuation rate of six decibels per octave is relatively easy to obtain, this value is usually preferable. If the frequency at which attenuation begins is increased, a larger rate of attenuation must be resorted to in order to maintain the same frequency response requirements, and vice versa.

Figure 1:
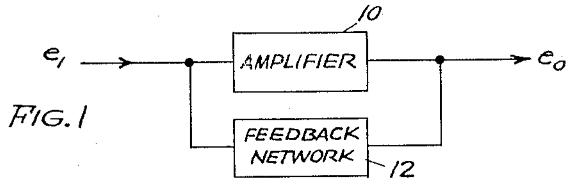
Fig. 1 is a block diagram of a conventional feedback amplifier.

A conventional feedback amplifier system is shown in Fig. 1 and comprises an amplifier 10 and a feedback network or loop 12. The amplifier, which in the absence of feedback has a gain of $\mu$, is supplied with a signal input voltage $e_i$ and produces an amplifier output $e_o$. If a feedback loop or network 12 having a gain $\beta$ is connected between the output and input circuits of amplifier 10 so that a portion of the output voltage $e_o$ is applied to the input of the amplifier in phase opposition to the input signal $e_i$, the gain of the amplifier may be reduced. By means of the degenerative feedback, the signal-to-noise ratio of the amplifier may be improved and the effects of low frequency noise may be reduced substantially. The feedback can be determined from the product $\mu\beta$ which represents the transmission around the complete loop formed by the $\mu$ and $\beta$ circuits together. It is sometimes difficult to separate the amplifier system into concise $\mu$ and $\beta$ parts, particularly in a multiple loop structure containing several feedback paths. Moreover, the forward and backward networks may each comprise a multiplicity of elements. The principles of operation, however, are not affected by these facts.

The input-output transfer function for a degenerative feedback amplifier is given by:

$$e_o=e_i\frac{\mu}{1+\mu\beta} \qquad (1)$$

In many applications feedback of the order of 60 decibels is often necessary for providing the required reduction of low frequency noise or slow instabilities, such as may occur in a receiver local oscillator. The feedback factor or return ratio $\mu\beta$ may well be very large at certain frequencies as compared to unity. In such cases Equation 1 reduces to:

$$e_o\approx\frac{e_i}{\beta} \qquad (2)$$

Equation 2 indicates that any effect in the feedback loop will have a proportional effect upon the system transfer function or gain. Therefore it has been the practice to maintain a substantially constant return ratio throughout the entire operating band.

In active feedback networks where a large feedback is used, the feedback must be such that oscillations are not introduced. At higher values of frequency, the amplifier produces phase shifts that cause the phase of the return ratio $\mu\beta$ to differ from the phase corresponding to negative feedback. In this event $\mu\beta$ reverses in polarity and introduces positive feedback, resulting in the production of undesirable oscillations. This problem of system instability is usually solved by the introduction of an attenuating network in the feedback loop of the system. Outside the normal frequency range of a feedback amplifier, it is desirable to attenuate as rapidly as possible to return ratio to reduce the gain to less than unity without introducing excessive phase shift.

It may be shown that if the amplitude of transmission varies with frequency at a constant rate, as at the upper end of the amplifier response characteristic, then the phase shift in radians is equal to $$\frac{\pi}{12}$$

times the variation in amplitude of transmission expressed in decibels change per octave change in frequency. The greatest cut-off attenuation rate that may be employed over an extended frequency spectrum in a feedback system thus is approximately twelve decibels per octave. An attenuation rate of 12 decibels per octave will result in a phase shift which approaches 180 degrees as frequency approaches infinity. With this rate of cut-off in the feedback network, the system would be unstable if the loop gain at infinite frequency was greater than one. Since the phase shift is very close to 180 degrees at higher frequencies, practically the same limitation as to instability applies as in the case of infinite frequency. In a practical amplifier, a margin of safety must be provided, thereby necessitating a slope of less than 12 decibels per octave. It is customary in practice to allow a 30-degree phase shift margin, thus giving a slope of $$\frac{150}{180}$$

times 12 or 10 decibels per octave.

Figure 3:
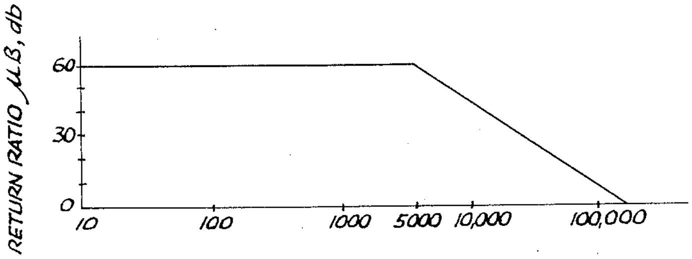
Figs. 3 to 6 are curves illustrating certain details of operation of the system of Fig. 2.

The characteristic for a typical amplifier having a flat response up to 5,000 cycles per second and 60 decibels feedback at low frequencies of the order of 60 cycles per second is shown in Fig. 3. In order to provide compensation by means of a network having a ten decibel per octave attenuation as previously described, the equipment must be capable of phase correction to six octaves above the operation band of the amplifier for 60 decibels feedback. In other words, attenuation of the return ratio must increase from 5,000 cycles per second at a 10 decibel per octave rate. The amplifier, therefore, must be capable of correction out to a frequency of 320 kilocycles. If compensating networks of lesser attenuation return are used, the frequency response requirements of the amplifier are even more severe. For example, if the rate of decrease of the return ratio $\mu\beta$ were six decibels per octave, the amplifier would have to operate through ten octaves above 5,000 cycles per second or 5.12 megacycles. Amplifiers capable of such wide band operation are difficult, if not impossible, to construct.

Figure 7:
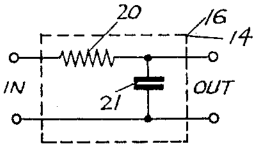
Figs. 7 and 8 illustrate possible compensating networks for use in the system of Fig. 2 when the loop gain is large as compared with unity.
Figure 8:
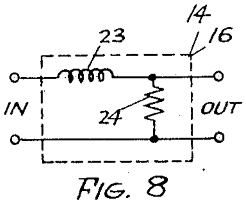

In cases where feedback is used to eliminate low frequency noise or low frequency instabilities in a translation network, it is desirable to begin the reduction of the return ratio well within the operating band of the system. This may be achieved by attenuating network 14 inserted in the feedback loop of Fig. 2. Although attenuating networks of any slope not exceeding 10 decibels per octave may be used, networks having a 6 decibel per octave attenuation rate are easy to realize physically. Two examples of several possible attenuating networks 14 capable of introducing an attenuation of 6 decibels per octave are shown in Figs. 7 and 8. Network 14 of Fig. 7 comprises a resistor 20 connected in series between the input and output terminals of the network and a condenser 21 connected in shunt with the input terminals. Similarly, network 14 of Fig. 8 consists of a serially-connected inductance 23 and a shunt-connected resistor 24 connected between the network input and output terminals. The attenuating network 14, however, is not limited to the examples shown in Figs. 7 and 8.

Figure 4:
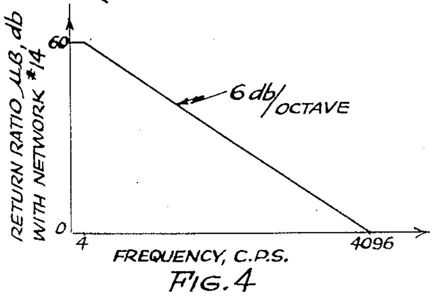
Figure 5:
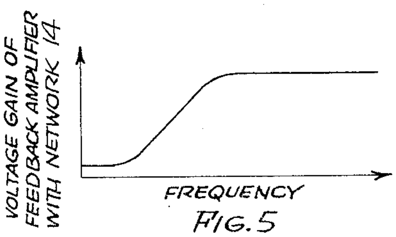

If, for example, an amplifier system requires 60 decibels feedback at very low frequencies, the attenuation of the return ratio may be started at 4 cycles per second and proceed at a rate of 6 decibels per octave out to a frequency of 4096 cycles per second, i. e., a frequency 10 octaves removed from 4 cycles per second, as shown in Fig. 4. The effect of the return ratio reduction upon the transfer function or gain of the system is shown in Fig. 5 from which the system gain with frequency over the entire frequency range is seen to be non-linear.

Figure 2:
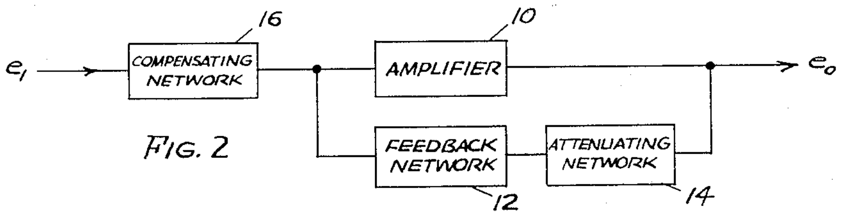
Fig. 2 is a block diagram of a translation system involving feedback in accordance with the invention.

In order to compensate for the effect of the attenuating network 14 on the amplifying system, a second or compensating network 16 is introduced in the amplifier input circuit, as shown in Fig. 2. Thus a reduction to unity return ratio may be had at approximately 4096 cycles per second, which is somewhat below the upper end of the system pass band.

A compensating network 16 having a six decibel per octave characteristic may be used provided the usable frequency range of the amplifier is always within the region where $\mu\beta$ is considerably greater than unity.

In the region where $\mu\beta$ is considerably greater than 1, the compensating network 16 will be identical to that of the attenuating network 14. If, for example, the attenuating network 14 of Fig. 7 is selected for use in the circuit of Fig.2, an identical network, or one having the same attenuation versus frequency characteristic, will be used for the compensating network 16. This identity of the two networks 14 and 16 is denoted by the use of both reference numerals 14 and 16 in connection with the networks shown in Figs. 7 and 8. The values of the components making up the networks 14 and 16 of Figs. 7 and 8 will depend upon the rate of attenuation per octave and the starting point of that attenuation.

In the example previously described, the overall pass band would remain essentially constant with frequency up to about 4 kilocycles.

In the above cited example, in the vicinity of 4 kilocycles, $\mu\beta$ approaches one and, for frequencies above this region, a 6 decibel per octave slope would not accurately compensate the feedback network transfer function.

Since the gain of the amplifier without compensating network 16 is given by $$\frac{\mu}{1+\mu\beta}$$

and since the total gain of the amplifier with network 16 (which is the product of the individual gains of the amplifier and network 16) should be independent of frequency, the transfer function or gain of the compensating network 16 will be given by $1+\mu\beta$. Such a network 16 will provide proper compensation at all frequencies regardless of whether $\mu\beta$ is less than, equal to, or greater than unity, and such a network is essential for accurate compensation at higher frequencies where $\mu\beta$ is of the order of unity or less than unity. A compensating network 16 having a transfer function $1+\mu\beta$ may be designed in accordance with design criteria well known to those skilled in the art, taking into account, of course, the characteristics of the entire amplifier system.

Figure 6:
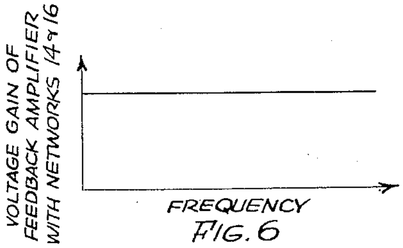

With a compensating network 16 having a transfer function $1+\mu\beta$—which, in the case where $\mu\beta$ is large as compared with unity, is identical to attenuating network 14—the gain of the complete system of Fig. 2 is constant regardless of frequency, as shown in Fig. 6.

By using the compensating network 16 in addition to network 14, the use of high return ratios at low frequencies is possible without appreciably extending the band width of the return loop.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A translation device for amplifying input signals over a given pass band and for reducing low frequency noise and instability comprising an amplifier of gain $\mu$, a degenerative feedback path of gain $\beta$ for coupling between the output and input circuits of said amplifier, a first network in said feedback path for providing a phase shift in said device which is less than 180 degrees, and a second network inserted in the input circuit of said amplifier and having a transfer function equal to $1+\mu\beta$ for compensating for the effect of said first network upon the frequency response characteristic of said amplifier.

2. A translation device for amplifying input signals over a given pass band and for reducing low frequency noise and instability comprising an amplifier of gain $\mu$, a degenerative feedback path of gain $\beta$ for coupling between the output and input circuits of said amplifier, a first passive network in said feedback path for providing a phase shift in said device which is less than 180 degrees, and a second passive network inserted in the input circuit of said amplifier and having a transfer function equal to $1+\mu\beta$ for compensating for the effect of said first network upon the frequency response characteristic of said amplifier.

3. A translation device for amplifying input signals over a preselected pass band and for suppressing low frequency discrepancies comprising an amplifier of gain $\mu$, a degenerative feedback path of gain $\beta$ for coupling between the output and input circuits of said amplifier, an attenuating network in said feedback path for commencing attenuation of the return ratio $\mu\beta$ at a frequency adjacent the low frequency end of said pass band, and means including a passive network inserted in the input circuit of said amplifier, said passive network having a transfer function substantially equal to $1+\mu\beta$ for compensating for the effect of said first network upon said amplifier pass band.

4. A translation device for amplifying input signals over a given pass band and for reducing low frequency noise and instability comprising an amplifier of gain $\mu$, a degenerative feedback path of gain $\beta$ for coupling between the output and input circuits of said amplifier, the return ratio $\mu\beta$ varying from greater than unity to less than unity over said pass band, a first passive network in said feedback path for reducing the amount of feedback at a rate not exceeding 10 decibels per octave starting at a frequency within said pass band in the vicinity of said low frequency, the rate of reduction of the return ratio $\mu\beta$ and the starting point for reduction of said return ratio being such as to effect a reduction to unity return ratio within said pass band, and a second passive network inserted in the input circuit of said amplifier and having a transfer function equal to $1+\mu\beta$ for compensating for the effect of said first network upon the frequency response characteristic of said amplifier.

5. A translation device for amplifying input signals over a given pass band and for reducing low frequency noise and instability comprising an amplifier of gain $\mu$, a degenerative feedback path of gain $\beta$ for coupling between the output and input circuits of said amplifier, the return ratio $\mu\beta$ varying from greater than unity to less than unity over said pass band, a first network in said feedback path for reducing the amount of feedback at a rate not exceeding 10 decibels per octave starting at a frequency within said pass band, the rate of reduction of the return ratio $\mu\beta$ and the starting point for reduction of said return ratio being such as to effect a reduction to unity return ratio within said pass band, and a second network inserted in the input circuit of said amplifier and having a transfer function equal to $1+\mu\beta$ for compensating for the effect of said first network upon the frequency response characteristic of said amplifier.

6. A translation device for amplifying input signals over a given pass band and for reducing low frequency noise and instability comprising an amplifier of gain $\mu$, a degenerative feedback path of gain $\beta$ for coupling between the output and input circuits of said amplifier, the product return ratio $\mu\beta$ being greater than unity over said pass band, a first network in said feedback path for providing a phase shift in said device which is less than 180 degrees, and a second network inserted in the input circuit of said amplifier and having an attenuation versus frequency characteristic which is the inverse of that of said first network for compensating for the effect of said first network upon the frequency response characteristic of said amplifier.

7. A translation device for amplifying input signals over a given pass band and for reducing low frequency noise and instability comprising an amplifier of gain $\mu$, a degenerative feedback path of gain $\beta$ for coupling between the output and input circuits of said amplifier, the product return ratio $\mu\beta$ being greater than unity over said pass band, a first network in said feedback path for providing a phase shift in said device which is less than 180 degrees, and a second network inserted in the input circuit of said amplifier and having an attenuation versus frequency characteristic which is the inverse of that of said first network for compensating for the effect of said first network upon the frequency response characteristic of said amplifier, said first and second networks being passive networks.

8. A translation device for amplifying input signals over a given pass band and for reducing low frequency noise and instability comprising an amplifier of gain $\mu$, a degenerative feedback path of gain $\beta$ for coupling between the output and input circuits of said amplifier, the return ratio $\mu\beta$ being greater than unity over said pass band, a first passive network in said feedback path for reducing the amount of feedback at a rate of six decibels per octave starting at a frequency within said pass band in the vicinity of said low frequency, the rate of reduction of the return ratio $\mu\beta$ and the starting point for reduction of said return ratio being such as to effect a reduction to unity return ratio within said pass band, and a second passive network inserted in the input circuit of said amplifier and characterized by a gain of six decibels per octave for compensating for the effect of said first network upon the frequency response characteristic of said amplifier.

References Cited in the file of this patent

UNITED STATES PATENTS

| | | |
|---|---|---|
| 1,994,457 | Barnes | Mar. 19, 1935 |
| 2,033,963 | Ware | Mar. 17, 1936 |
| 2,131,366 | Black | Sept. 27, 1938 |